(12) United States Patent
Harding

(10) Patent No.: US 12,715,382 B2
(45) Date of Patent: Aug. 25, 2026

(54) REMOVABLE BRUSH GUARD APPARATUS AND METHODS

(71) Applicant: Bryce Harding, Porterfield, WI (US)

(72) Inventor: Bryce Harding, Porterfield, WI (US)

( * ) Notice: Subject to any disclaimer, the term of this patent is extended or adjusted under 35 U.S.C. 154(b) by 379 days.

(21) Appl. No.: 18/369,796

(22) Filed: Sep. 18, 2023

(65) Prior Publication Data

US 2024/0010150 A1 Jan. 11, 2024

Related U.S. Application Data

(63) Continuation-in-part of application No. 17/552,534, filed on Dec. 16, 2021, now Pat. No. 11,760,290.

(60) Provisional application No. 63/128,803, filed on Dec. 21, 2020.

(51) Int. Cl.
*B60R 19/46* (2006.01)
*B60R 19/52* (2006.01)

(52) U.S. Cl.
CPC .............. *B60R 19/46* (2013.01); *B60R 19/52* (2013.01)

(58) Field of Classification Search
CPC ... B60R 19/52; B60R 19/54; B60R 2019/522; B60R 19/44; B60R 19/46
USPC ................................. 293/115, 118, 142, 145
See application file for complete search history.

(56) References Cited

U.S. PATENT DOCUMENTS 3,709,542 A * 1/1973 Fehlau .................... B60R 19/56 293/118
4,099,760 A * 7/1978 Mascotte ............... B62D 43/02 224/507
4,671,552 A 6/1987 Anderson et al.
5,277,465 A 1/1994 Weir
6,056,308 A * 5/2000 Harrison ................ B60D 1/075 280/460.1
6,290,271 B1 9/2001 Geisler
6,315,338 B1 11/2001 Schneider et al.
6,447,032 B1 * 9/2002 Howell, Sr. ............. B60R 19/52 224/489

(Continued)

FOREIGN PATENT DOCUMENTS

JP H0671330 U * 10/1994

OTHER PUBLICATIONS

"Plow mount brush guard install." Website. Hand made brush guard. Published Sep. 16, 2016. Author "dynamic", FTE Chapter Leader.

(Continued)

*Primary Examiner* — Jason S Morrow
(74) *Attorney, Agent, or Firm* — Device Patent LLC

(57) ABSTRACT

A brush guard system for mounting on the front of a vehicle. The brush guard system includes a removable brush guard construct having a brush guard shield roughly the size of the front of a vehicle. The brush guard shield is mounted to a floor assembly. The floor assembly comprises a left pivot assembly spaced from a right pivot assembly that releasably engages a hooking bar that is secured to the frame of the vehicle. The hooking bar utilizes a pair of spaced hook plates to receive and support the brush guard construct. Pivot pins are utilized to pivotably mount the brush guard construct to the hooking bar and retractable locking pins are utilized to lock the brush guard construct to the hooking bar. A deployable pivot wheel transport assembly provides a convenient method for easy donning and doffing the brush guard from the vehicle.

20 Claims, 13 Drawing Sheets

(56) References Cited

U.S. PATENT DOCUMENTS 6,526,677 B1 * 3/2003 Bloxdorf ................ E01H 5/066 37/231
6,685,245 B1 2/2004 Houseman et al.
7,121,596 B2 10/2006 Rood
7,290,359 B2 11/2007 Potak
D614,095 S 4/2010 Fretz et al.
8,220,849 B2 * 7/2012 Beaird, III .............. B66D 1/28 293/142
8,998,291 B1 * 4/2015 Addis ..................... B60R 19/52 296/180.1
9,108,581 B2 * 8/2015 Perez ................... B60Q 1/0483
9,499,095 B1 * 11/2016 Buehler ................... B60Q 1/26
9,505,364 B1 * 11/2016 Schulzetenberg ...... B60R 19/52
9,884,601 B1 2/2018 Candido
11,433,838 B2 * 9/2022 Thompson .............. B60R 19/52
11,760,290 B2 * 9/2023 Harding .................. B60R 19/54 293/115
2009/0212581 A1 8/2009 Drever
2010/0283272 A1 11/2010 Schneider
2011/0006553 A1 1/2011 Fretz et al.
2011/0049914 A1 * 3/2011 Beaird, III ............... B66D 1/28 293/115
2014/0306469 A1 10/2014 Drever
2022/0153216 A1 * 5/2022 Drever ................ E05D 11/1007

OTHER PUBLICATIONS

Author is MVHAULER. Published May 5, 2009 on website. "Grille guard/deer slayer project".

Fisher Engineering, Published Mar. 15, 2010. ProTube Bumper/Grille Guard. Installation instructions.

Monroe Truck & Auto Accessories. Webpage. Published at least by Jun. 3, 2020. "The Ultimate Off Road Undercarriage attachment bull bar—Compatible with all BOSS Plows."

ZIPPELK (junior member on plowsite.com). "Off-season plow-mount brush/grille guard (deer catcher)." Published on Jun. 30, 2012, pp. 1-5.

* cited by examiner 100
183
102
240
132
103
150
110
167
181

183
102
103
150
122
262
110

114
130
110
134
132
112
126
122
128
124
118
126
116
122
128
120
124
136

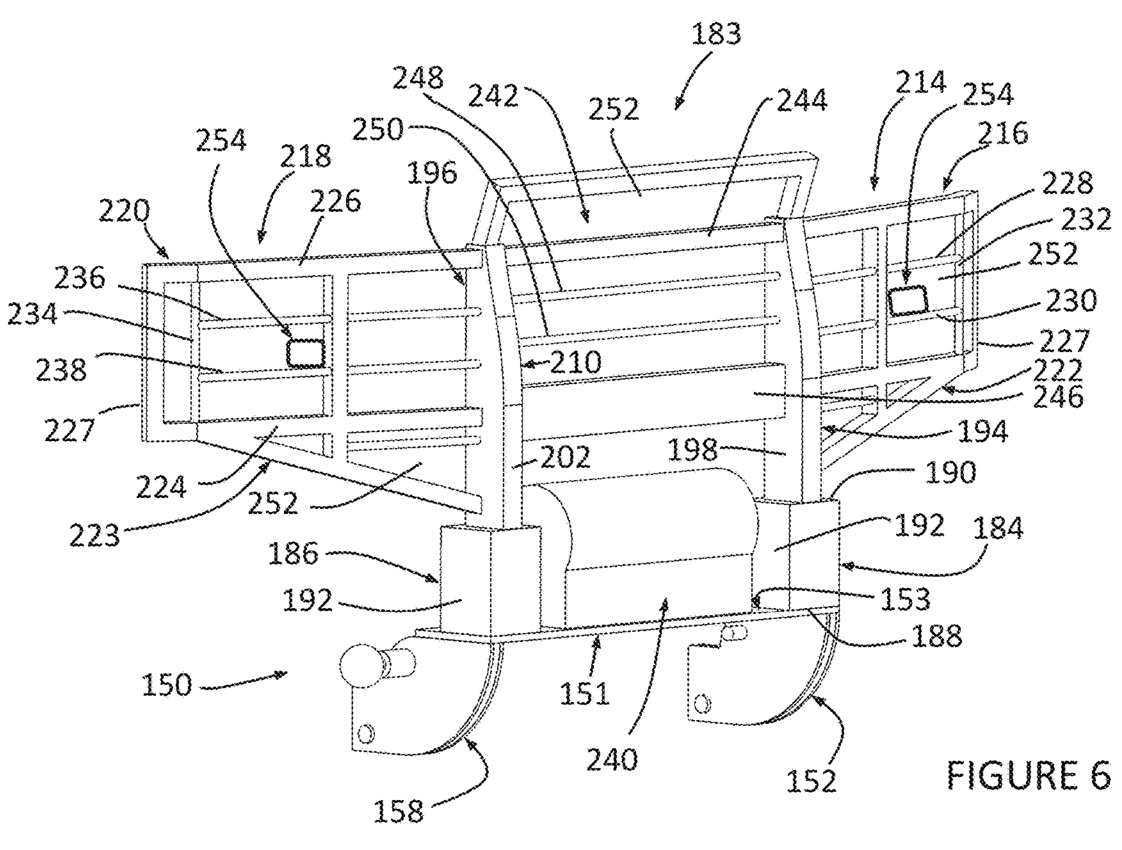
FIGURE 6
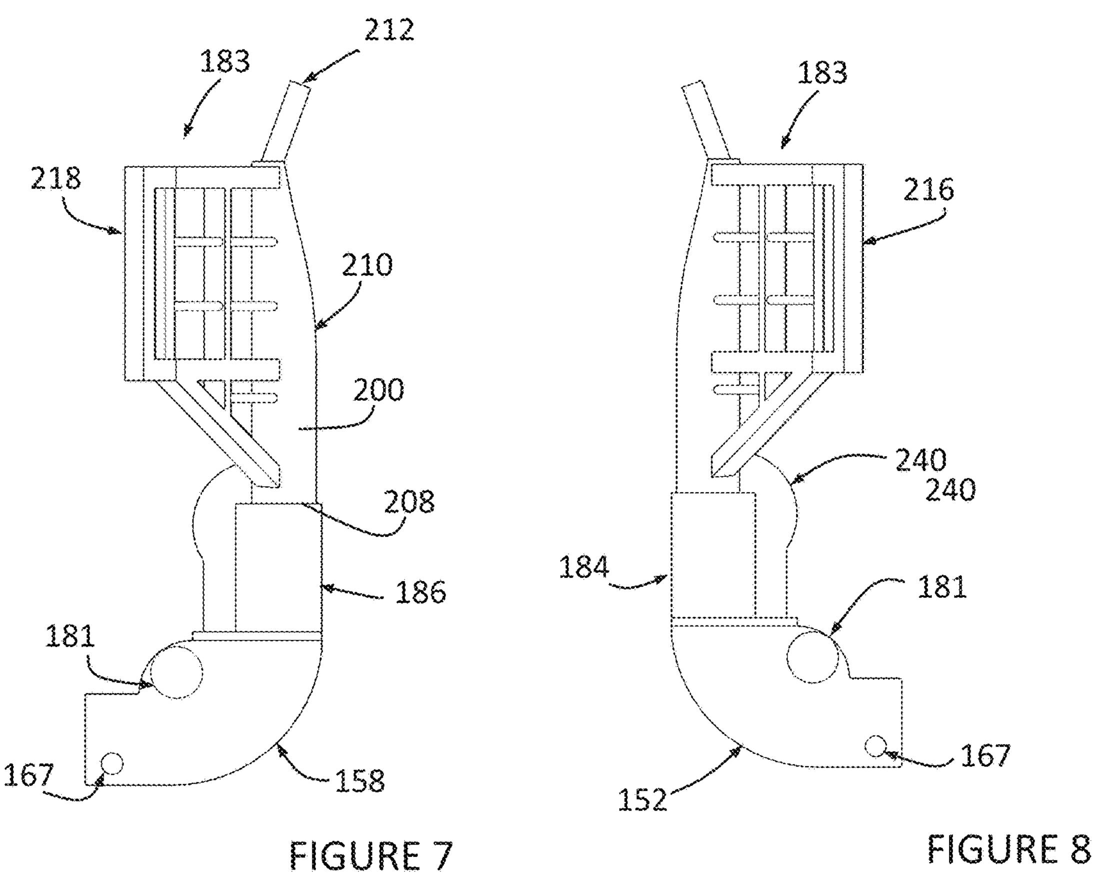
FIGURE 7
FIGURE 8

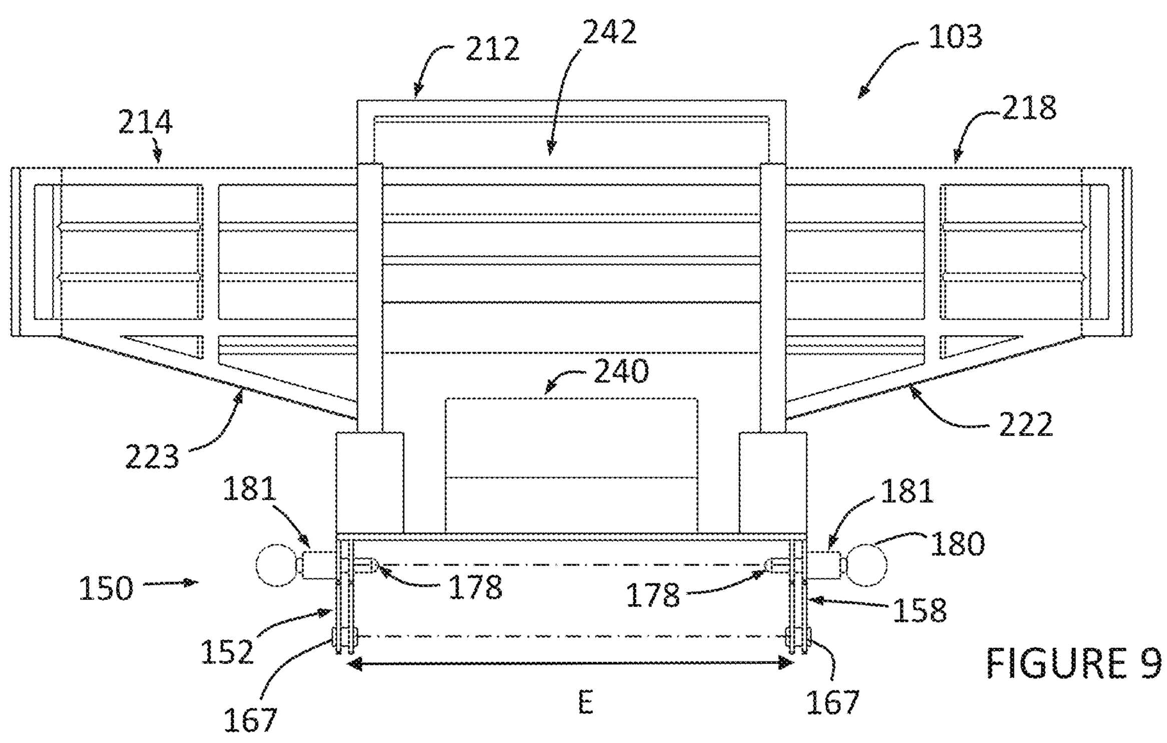
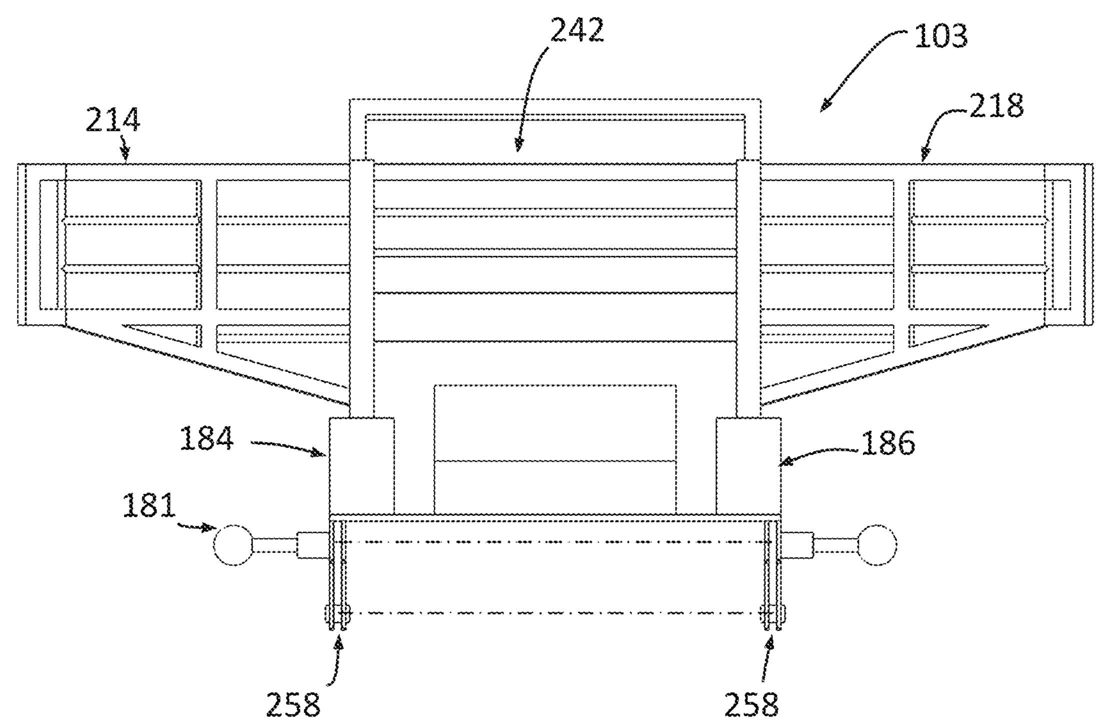
FIGURE 10

290
Retract lock pins and pivot brush guard construct away from hooking bar.

292
Lift brush guard construct out of pivot window to remove from hooking bar.

294
Lower brush guard construct on to a stand.

103E
242E
218E
214E
100E
337E
156E
154E
152E
322E
336E
160E
162E
158E
320E 342E
334E
240E
331E
151E
154E
181E
336E
160E
167E
328E
327E
323E
332E
325E
333E,
342E
324E
322E 342E
333E
342E
336E
331E
Axis A
333E
330E
329E
332E
341E
326E
329E
322E
343E 334F
240F
340F
339F
151F
167F
338F
330F
331F
342F
328F
329F
333F
332F
327F
326F
323F
324F
322F 300
Obtain vehicle having hooking bar with spaced hook plates having pivot window/lock aperture, a pivot wheel transport assy., and with pivotable brush guard seated therein.

302
Activate actuator to lower pivot wheel to ground.

304
Retract lock pin from lock apertures.

306
Control forward pivot until supported by pivot wheel.

308
Activate actuator to raise pivot wheel, brushguard pivots forward.

310
Release electrical couplings.

312
Grasp brush guard pivoting forward over pivot wheel releasing brushguard from hook plates.

314
Continue to move brushguard away from vehicle balancing on pivot wheel.

316
Pivot brushguard backwards until seated on ground.

318
Reverse steps to load brushguard on to hooking plates.

FIGURE 26

REMOVABLE BRUSH GUARD APPARATUS AND METHODS

CROSS REFERENCE TO RELATED APPLICATIONS

This application is a U.S. Continuation-In-Part patent application claiming priority to U.S. Non-Provisional patent application Ser. No. 17/552,534 filed on Dec. 16, 2021 which claims the benefit of Provisional Patent Application No. 63/128,803 filed Dec. 21, 2020, the entire disclosures of which are hereby incorporated by reference and relied upon.

BACKGROUND OF THE INVENTION

Field of the Invention. The invention relates generally to brush guards mounted to the front of trucks, and more particularly to brush guards having the ability to be quickly donned and doffed the vehicle.

Description of Related Art Offered on the market today are a variety of brush guards configured for mounting to the front of vehicles, typically trucks. In most cases, these brush guards are bolted to the frame of the vehicle and require a significant amount of effort to mount and dismount due the multitude of fasteners and often the associated corrosion. What is needed is a stable and strong brush guard utilizing a quick-release format so that it can be quickly mounted and dismounted without removal or application of fasteners. Preferred characteristics of this brush guard include extending laterally substantially across the width of the vehicle and vertically to the vehicle's engine hood. As an option, the brush guard preferably houses a winch for utilization at the front of the vehicle.

SUMMARY OF THE INVENTION

In response to the needs presented above, disclosed herein is a novel and quick-release brush guard construct and system configured for rapid mount and dismount to the front of a vehicle such as a truck. The brush guard system comprises a brush guard construct that comprises of a brush guard shield and a floor assembly. Spaced pivot pins in the brush guard construct are received in a pair of spaced hook plates on a hooking bar that is secured to a frame of a vehicle. A pair of opposed lock assemblies lock the brush guard construct in an upright position such that the brush guard construct cannot be removed until the lock pins are retracted.

In one form, a brush guard system comprises a brush guard shield that extends laterally across the front end of a vehicle.

In one form, the brush guard shield extends substantially the height of the vehicle's engine hood.

In one form, the brush guard shield is curved or segmentally curves such that the mid-section of the brush guard shield is positioned forward of a left brush guard wing and right brush guard wing.

In one form, the brush guard shield comprises a plurality of openings to allow wind to blow through.

In one form, openings in the left brush guard wing and right brush guard wing are aligned over the vehicle's headlights in a lock configuration to provide passage of light through the brush guard shield.

In one form, the brush guard shield extends upward from a floor assembly.

In one form, the brush guard shield extends upward from anchor blocks.

In one form, the brush guard shield extends upward directly from a base plate when anchor blocks are absent.

In one form, extending from the left lateral side of the left brush guard post is the left brush guard wing defined by a left brush guard frame.

In one form, extending from the right lateral side of the right brush guard post is the right brush guard wing defined by a right brush guard frame.

In one form, the left brush guard post and right brush guard post extend down and are fixed to a base plate of the floor assembly.

In one form, the brush guard posts are fixed to an upper block face of corresponding anchor blocks.

In one form, a winch is secured to the upper face of the base plate between the spaced left anchor block and right anchor block.

In one form, a brush guard construct comprises both the floor assembly and brush guard shield.

In one form, the floor assembly comprises base plate.

In one form, the floor assembly comprises a series of substantially vertical pivot plates mounted in pairs at opposing lateral ends of the base plate.

In one form, the left pivot assembly comprises the outer left pivot plate and inner left pivot plate, whereas, the right pivot assembly comprises the outer right pivot plate and inner right pivot plate.

In one form, the pivot plates (in a locked configuration) comprises a pivot plate body with an inner face (facing medially when assembled) and an outer face (facing laterally when assembled).

In one form, a pivot hole is located near a rear inferior side of the pivot plate and extends perpendicular between the inner face and outer face and is sized for a housing pivot pin therein.

In one form, a lock hole defined by a lock face, is located near a mid-superior side of the of the pivot plate and extends perpendicular between the inner face and outer face and is sized and shaped for housing a retractable lock pin therein.

In one form, at least one of the lock hole and the pivot hole are circular.

In one form, a planar upward facing support face is located at a superior aspect of the pivot plate body and is fixed to the lower face of the base plate such that the pivot plate body is substantially perpendicular to the horizontal base plate.

In one form, welds and fasteners can be utilized throughout the brush guard system as a means of fixation between metals parts abutting each other.

In one form, aligned with the central axis of the lock hole and fixed to the outer faces of outer left and outer right pivot plates is a lock body of a lock assembly.

In one form, the lock assemblies comprise a translatable lock pin that extends through the lock body that can be set to engage and disengage the lock hole of the respective pivot plate body.

In one form, plate gaps are aligned in substantially front to back vertical planes as are the pivot plate bodies. The plate gaps have a width sufficient for sliding fit of a hook arm and top arm of a hook plate therein.

In one form, the brush guard system includes a hooking bar that comprises an elongate hooking strut fixedly capped on the ends by a left hook mount plate and a right hook mount plate.

In one form, evenly spaced and fixed substantially perpendicular on the hooking strut is a left hook plate and a right hook plate.

In one form, a pivot wall extending between the opposed broad faces of the hook plate body defines an entry pivot port and L-shaped pivot window that extends through the plate. The L-shaped pivot window is sized to cradle a pivot pin therein and thereby support the brush guard construct in locked and unlocked configurations. The pivot window defines a top arm and a hook arm.

In one form, the pivot window defines a hook arm that extends upward and a top arm at the superior side of the pivot window. At the forward end of the top arm is a lock aperture again extending between the opposed broad faces of the hook plate body.

In one form, a method of installing a brush guard construct to the front of a vehicle comprises the following steps. Obtaining a vehicle having a hooking bar coupled to the vehicle frame. Removing a snowplow from the hooking bar if present. Obtaining a brush guard construct having a brush guard shield coupled to a pair of pivot assemblies having locking pins and comprise a vertically orientated plate gap operable between opposed pivot plates for receiving a portion of the hook plates therebetween. Elevating the brush guard construct and tilting the brush guard construct. Aligning the hook arm with the respective plate gaps. Aligning the pivot pins with the pivot window in the hook plate. Moving the brush guard construct toward the hooking bar and lowering such that the pivot pins are seated on the pivot wall in the pivot window. Retracting the lock pins then pivoting the brush guard construct toward the hooking bar and aligning the lock pins with the lock apertures on the lock plates. Translating the lock pins through the lock apertures on the lock plates and joining electrical connectors to power lights mounted on the brush guard construct when present.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein:

FIG. 6 depicts a front perspective view of a brush guard system;

FIG. 7 depicts a side view of the brush guard system of FIG. 6;

FIG. 8 depicts the opposite side view of the brush guard system of FIG. 7;

FIG. 9 depicts a rear view of a brush guard system with lock pins engaged;

FIG. 10 depicts a rear view of the brush guard system of FIG. 9 with lock pins retracted;

Figure 26:
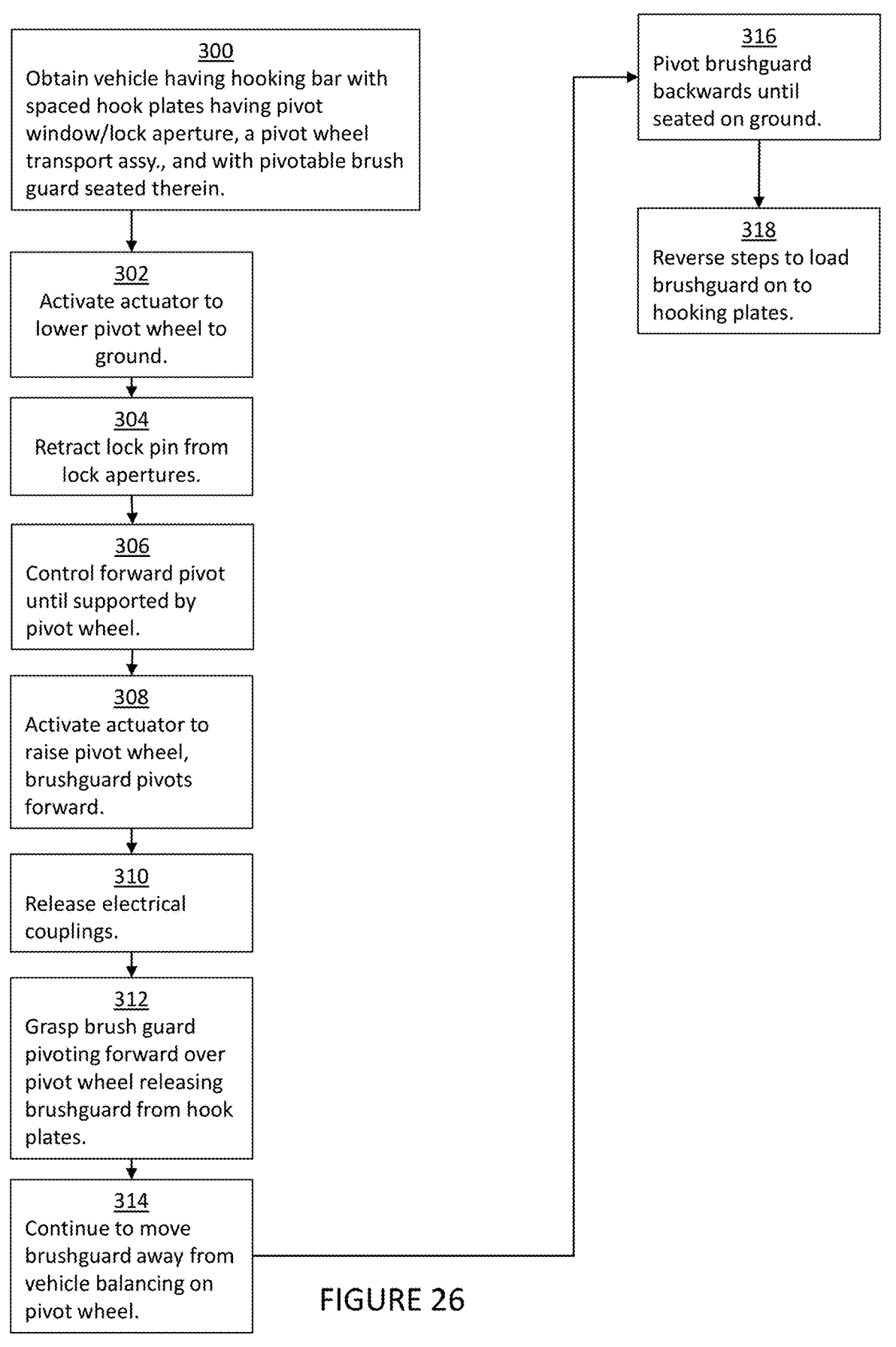

FIG. 26 depicts a diagram of the steps that can be used in a method to remove a brush guard construct using a deployable pivot wheel transport assembly;

DETAILED DESCRIPTION OF SELECTED EMBODIMENTS OF THE INVENTION

Select embodiments of the invention will now be described with reference to the Figures. Like numerals indicate like or corresponding elements throughout the several views. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes, or which is essential to practicing the invention described herein.

Figures 1, 2:
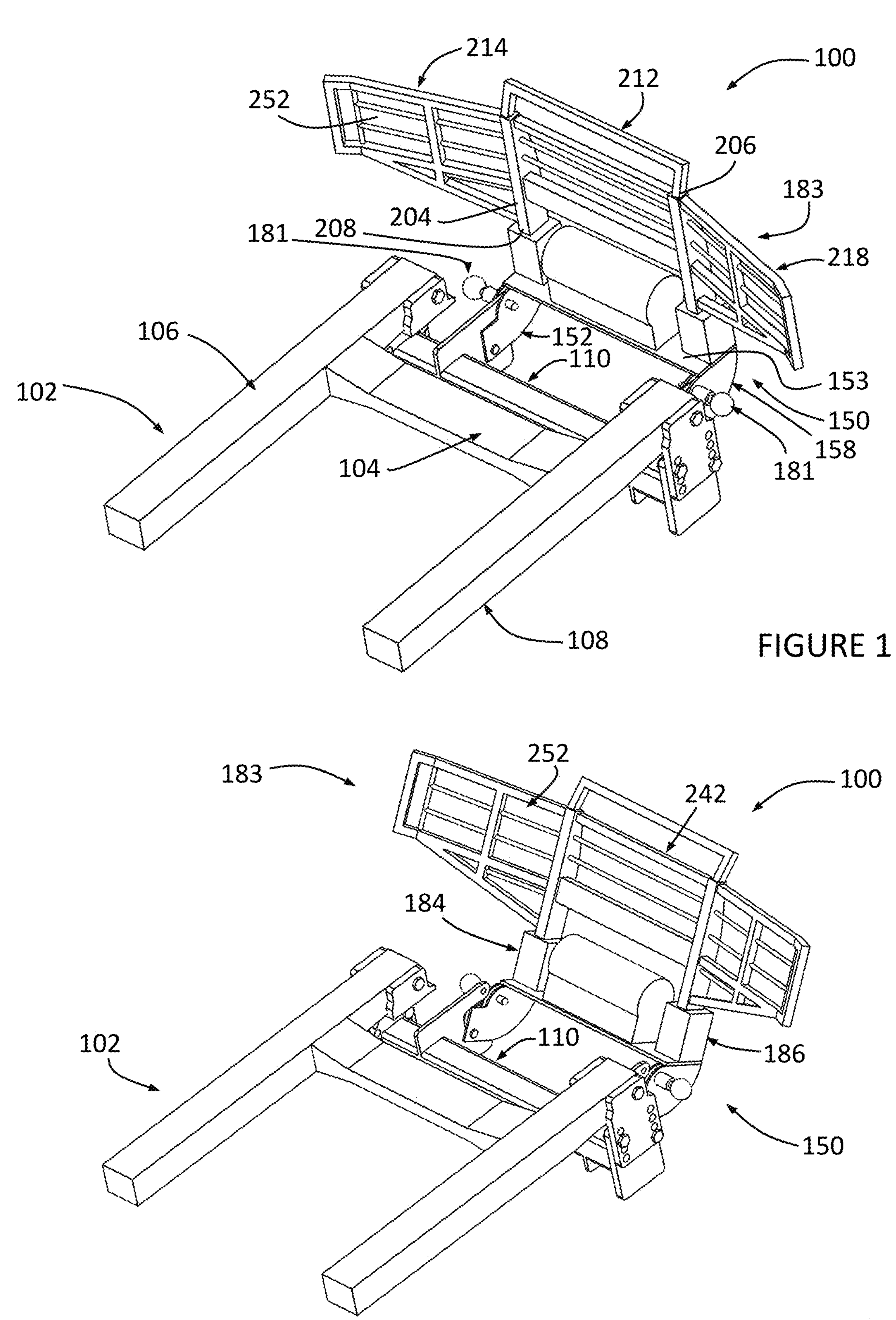
FIG. 1 depicts a perspective view of a brush guard system secured in a locked configuration to a pair of hook plates of a vehicle's frame mounted snowplow mount.
FIG. 2 depicts a perspective view of a brush guard system secured in an unlocked configuration with a pair of hook plates of a vehicle's frame mounted snowplow mount.

FIG. 1 depicts a preferred embodiment of a brush guard system 100. The brush guard system 100 comprises a brush guard shield 183 that in preferred forms extends laterally across the front end of the vehicle 101 (FIG. 15B) and is substantially the width of the vehicle's front end (i.e. approximately 6 feet to 7 feet-although these values can vary). It is preferred, although not required, that the brush guard shield 183 extends substantially the height of the vehicle's front end to the height of its engine hood (i.e. typically 40 inches or more from ground) and parts of the brush guard shield can extend higher such as superior handle 212 which can be used by the user during mounting and dismounting of the brush guard and/or pivot it forward and back. As illustrated in at least FIGS. 1 and 6, the brush guard shield 183 preferably is curved or segmentally curves such that the mid-section 242 of the brush guard shield 183 is positioned forward of left brush guard wing 214 and right brush guard wing 218. In addition, the brush guard shield 183 comprises a plurality of openings 252 to allow wind to blow through for cooling of the vehicle's engine and also to provide for the forward transmission of light from the vehicle's lighting system. Here, brush guard shield 183 extends upward from floor assembly 150 and specifically in this embodiment from the left anchor block 184 and right anchor block 186 (FIG. 6) which in turn extend from the upper face 153 of base plate 151. In alternative embodiments, the brush guard shield extends upward directly from the base plate when the anchor blocks are absent.

In this embodiment (FIG. 6), the brush guard shield 183 is substantially supported by left brush guard post 194 and right brush guard post 196 which at their inferior ends are secured to upper block face 190 of each anchor block. In this embodiment, the brush guard posts widen front to back from a superior to an inferior portion of the brush guard post whereas they comprise a substantially uniform lateral thickness. Each brush guard post comprises a brush guard post body 210 having an inner surface 198 facing medial, an outer surface 200 facing lateral, a front surface 202 facing front, a rear surface 204 facing back, a superiorly facing superior surface 206, and an inferior facing inferior surface 208. In this embodiment, these surfaces are generally flat. The opposed left brush guard post 194 and right brush guard post 196 laterally define mid-section 242 of the brush guard shield 183. Extending substantially horizontal between the left and right brush guard posts is a superiorly positioned mid-superior support beam 244 and an inferiorly positioned mid-inferior support beam 246. Again, substantially horizontal and spaced inferiorly from the mid-superior support beam 244 is center upper support rod 248 and yet further inferior is center lower support rod 250.

Extending from the left lateral side of the left brush guard post 194 is left brush guard wing 214. The left brush guard wing is defined by a left brush guard frame 216. Similarly, extending from the right lateral side of the right brush guard post 196 is right brush guard wing 218. The right and left brush guard wings are defined by an inferiorly positioned inferior support beam 224, a superiorly placed superior support beam 226, and a lateral support beam 227 enclosing the lateral ends extending upwards between the inferior support beam 224 and superior support beam 226. Spaced medially from each lateral support beam 227 is a lateral support rod which in this case is left lateral support rod 232 and right lateral support rod 234. Extending medially from these lateral support rods is a left upper support rod 228 and a left lower support rod 230 and a right upper support rod 236 and a right lower support rod 238. The support rods 228, 230, 236, 238 terminate at the nearest left brush guard post 194 or right brush guard post 196.

In some embodiments, the left brush guard post 194 and right brush guard post 196 extend down and are fixed to base plate 151 of floor assembly 150. However, in other embodiments, the brush guard posts are fixed to upper block face 190 of the corresponding anchor blocks. The respective right anchor block 186 and left anchor block 184 are in turn fixed at their lower block faces 188 at their inferior ends to the upper face 153 of base plate 151 as illustrated in FIG. 6. In some embodiments, the anchor blocks have a substantially block or elongate block shaped body having four sides in addition to the upper block face and lower block face. Here, the anchor blocks are defined by side block faces 192 between the upper block face 190 and lower block face 188. In some embodiments, a winch 240 is secured to the upper face 153 of base plate 151 between spaced left anchor block 184 and right anchor block 186 as illustrated in the Figures. In some embodiments, a portion of the anchor blocks can be removed to make additional room for the winch. As noted in FIG. 9, extending inferior at an angle from the inferior support beam 224 on the left and right is a respective left drop frame 222 and right drop frame 223 which are an extension of the brush guard shield 183 that terminates on lateral sides of the left brush guard post 194 and right brush guard post 196. As further noted in FIG. 6, lights 254 can be mounted to a portion of the brush guard shield with power extending to the lights by wires from the vehicle. As those skilled in the art will recognize, the various support structures can assume different shape and size profiles.

A brush guard construct 103 (FIG. 11) comprises both the floor assembly 150 and brush guard shield 183. In preferred embodiments, the brush guard shield and the floor assembly are manufactured of metals, however other materials may be used. The metal parts can be welded or fastened together or use other appropriate techniques for fixation known in the art.

In this embodiment, the floor assembly is constructed of a base plate 151 which here is shaped substantially as a rectangle with an upper face 153 facing upward and a lower face 155 facing downward. The floor assembly 150 also comprises a series of substantially vertical pivot plates mounted in pairs (left pivot assembly 152, right pivot assembly 158) at opposing lateral ends of the base plate 151. The left pivot assembly 152 comprises the outer left pivot plate 154 and inner left pivot plate 156, whereas, the right pivot assembly 158 comprises the outer right pivot plate 160 and inner right pivot plate 162. In this embodiment, each pivot plate comprises a substantially similar profile whereby when horizontally aligned and fixated to the lower face 155 of base plate 151, features of the plates align.

Figure 13:
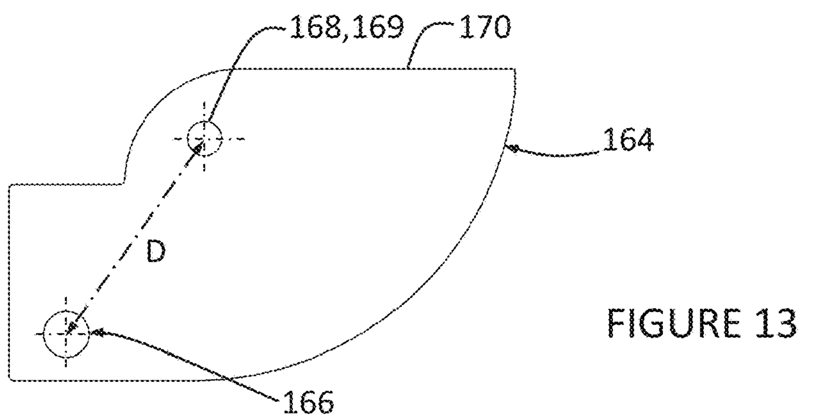
FIG. 13 depicts a side view of a pivot plate body as part of the floor assembly.

Each pivot plate (in a locked configuration) comprises a pivot plate body 164 as illustrated in FIG. 13 with an inner face 172 (facing medially when assembled) and an outer face 174 (facing laterally when assembled). A pivot hole 166, located near a rear inferior side of the pivot plate in this embodiment, extends perpendicular between the substantially flat inner face 172 and outer face 174 and is sized for a housing pivot pin 167 this is secured therein. In this embodiment, the pivot hole is circular. A lock hole 168 defined by lock face 169, is located near a mid-superior side of the of the pivot plate in this embodiment and extends perpendicular between the inner face 172 and outer face 174 and is sized and shaped for housing a retractable lock pin 178 therein (cylindrical in this embodiment). A substantially planar upward facing support face 170 at a superior edge of the pivot plate body 164, is fixed to the lower face 155 of base plate 151 such that the pivot plate body is substantially perpendicular to the base plate in this embodiment. Welds 256 and fasteners can be utilized throughout the brush guard system as a means of fixation between metals parts abutting each other.

Figure 14:
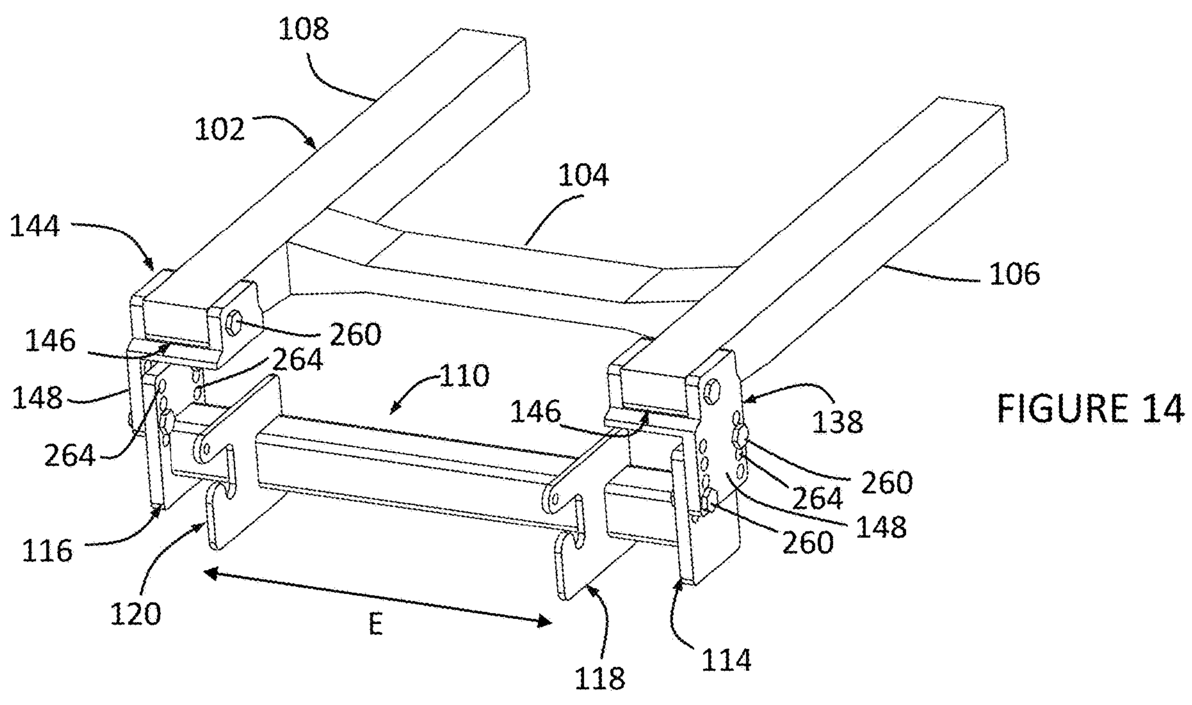
FIG. 14 depicts fixation of a hooking bar to a vehicle frame.

Aligned with the central axis of lock hole 168 and fixed to the outer faces 174 of outer left and right pivot plates 154,160 is a lock body 176 of lock assembly 181. The lock assemblies 181 comprise a retractable lock pin 178 that extends through the lock body 176 that can be set to engage and disengage lock hole 168 of pivot plate body 164. This action between engagement and disengagement can be performed by hand or remotely activated. In the locked position, lock pin 178 on a respective side extends through both plates of the respective right pivot assembly 158 and left pivot assembly 152. In the unlocked position, the lock pin 178 is retracted and is clear of the plate gap 258 formed between the adjacent pivot plates. In preferred embodiments, lock assemblies 181 can be set to remain in the locked or unlocked configuration without constant force from the user on lock handle 180. As illustrated in FIG. 9, the distance between the plate gaps 258 in the left pivot assembly 152 and right pivot assembly 158 is a distance 'E' which corresponds to the distance 'E' between the left hook plate 118 and right hook plate 120 as illustrated in FIG. 14 whereby the pivot assemblies will receive the respective hook arms 128 in the respective plate gap 258 for pivoting support about pivot pins 167. As depicted in the drawings, the plate gaps 258 are aligned in substantially front to back vertical planes as are the pivot plate bodies 164. The plate gaps 258 have a width sufficient for sliding fit of the hook arm 128 and top arm 130 of a hook plate therein.

Figures 3, 4, 5:
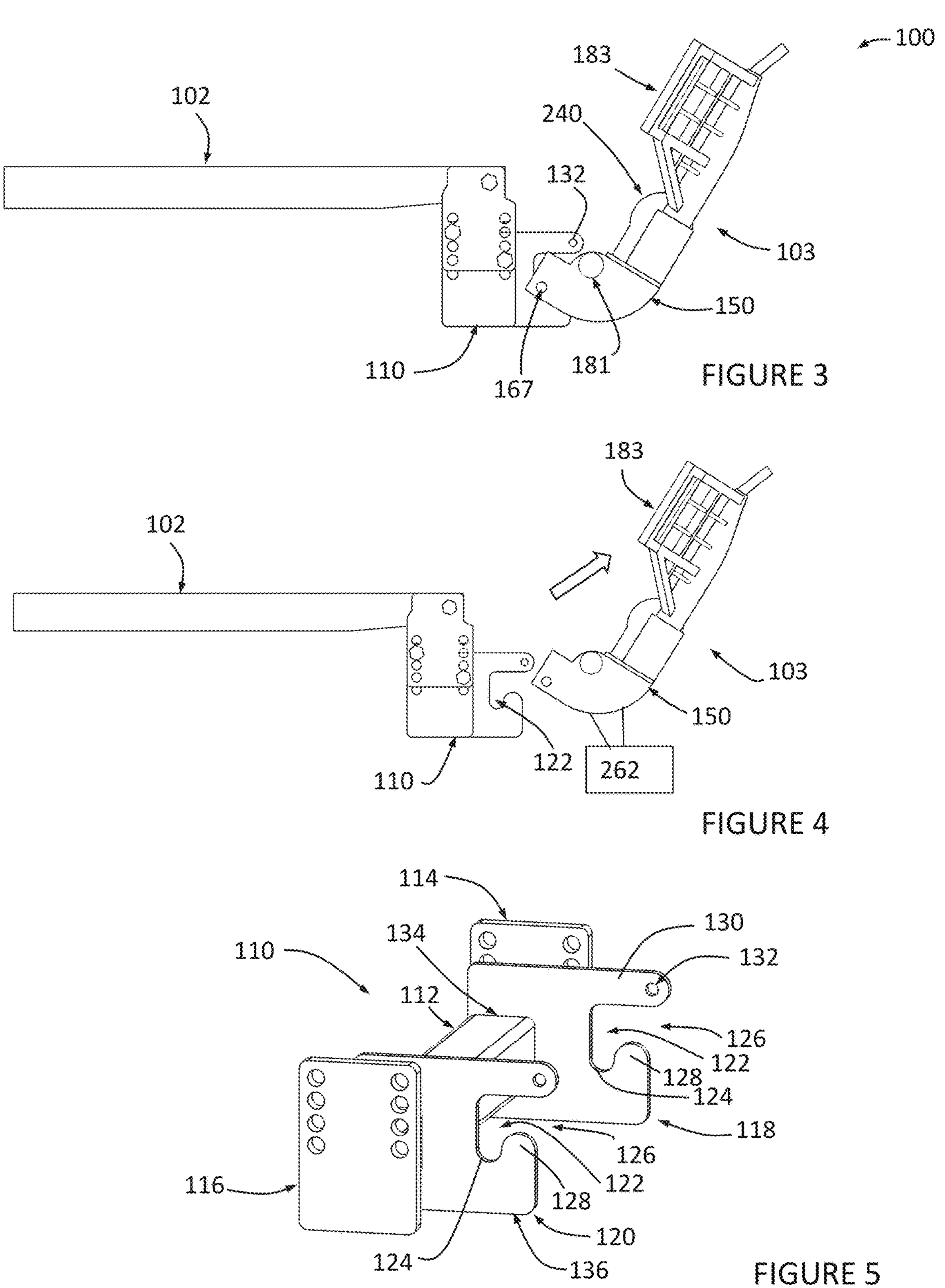
FIG. 3 depicts a side view of a brush guard system in an unlocked configuration seated in a hooking bar that is secured to the frame of a vehicle.
FIG. 4 depicts a side view of a brush guard system as it transitions from an unlocked configuration to a removed configuration.
FIG. 5 depicts a perspective view of one embodiment of a hooking bar utilized to removably secure a brush guard system to the frame of a vehicle.

FIG. 5 illustrates one embodiment of a hooking bar 110 portion of a brush guard system 100. The hooking bar 110 comprises an elongate hooking strut 112 fixedly capped on the ends by a left hook mount plate 114 and a right hook mount plate 116. Evenly spaced and fixed substantially perpendicular on hooking strut 112 is left hook plate 118 and right hook plate 120. The elongate hooking strut 112 extends through and is fixed at strut recess 134 in each hook plate by using a weld for example. The left and right hook plates are again spaced a distance 'E', again to mate within the respective plate gaps 258 of the floor assembly 150. The left and right hook plates in this embodiment are duplicates comprising a plate like hook plate body 136. From a front side of the hook plate body, a pivot wall 124 extending between the opposed broad faces of the hook plate body defines an entry pivot port 126 and L-shaped pivot window 122 that extends through the plate and that is sized to cradle pivot pin 167 therein and thereby supporting the brush guard construct 103 in locked and unlocked configurations. The pivot window 122 defines an inferiorly placed hook arm 128 that extends upward and a top arm 130 at the superior side of the pivot window 122. At the forward end of top arm 130 is a lock aperture 132 again extending through the opposed broad faces 119 of the hook plate body. Here the lock aperture 132 is cylindrical and sized to receive and contain translating lock pin 178 in a locked configuration.

FIG. 14 illustrates one embodiment of a hooking bar 110 of FIG. 5 coupled to the vehicle frame 102 of a vehicle such as a truck. Alignment holes 264 extending through the left and right hook mount plates 114, 116, mate with alignment holes 264 extending through a left coupler bracket 138 and the respective right coupler bracket 144. The multiple vertical holes on each, provide for vertical adjustment therebetween and are fixed using a plurality of fasteners 260.

The left coupler bracket 138 and right coupler bracket 144 comprise a vertically orientated side arm 148 with descending pairs of alignment holes 264 extending therethrough. On a superior side of the coupler brackets is an upper-U 146 that is sized to cradle the respective left frame rail 106 and right frame rail 108 of the vehicle therein and are secured with fasteners 260.

Note in FIG. 1 the brush guard construct 103 (brush guard shield and floor assembly) is in an upright and locked position (locked configuration) as evidenced by the lock pins 178 extending through the left and right pivot assemblies 152,158 and seated in the lock aperture 132 of the respective hook plates. FIG. 2 illustrates an unlocked configuration whereas the brush guard construct 103 is in a tilted forward position and the lock pins 178 are disengaged from the lock aperture 132 of the hook plates. This orientation is also viewed from the side in FIG. 3. Note once in the unlocked configuration, the brush guard construct can be elevated such that pivot pin 167 on both the left and right sides can be removed from the pivot window and out the pivot port (removed configuration). The hooking bar 110 is now available for use to hold and secure other attachments such as a snowplow. Remounting the brush guard construct is a matter of removing other tools from the hooking bar such as a snowplow. Then the brush guard construct 103 is aligned such that the hook arms 128 of the left and right hook plates align with the plate gaps 258. The brush guard construct is then lowered forward into the pivot ports 126 such that each pivot pin 167 resides in the pivot windows 122. The brush guard construct is then pivoted towards the front of the vehicle and the lock assemblies 181 engaged to lock in position. Electrical connectors to the brush guard are then connected.

Figure 11:
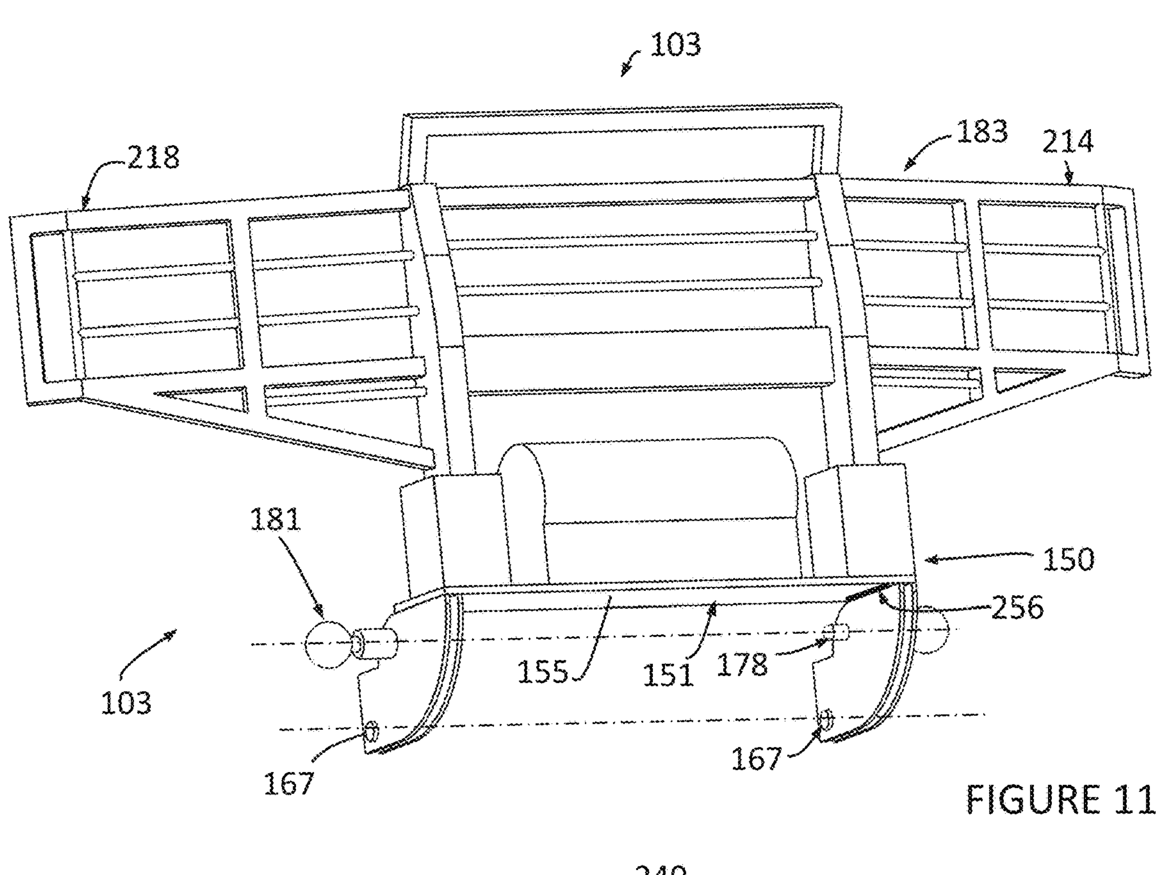
FIG. 11 depicts a front perspective view of a brush guard construct showing alignment between opposing pivot pins and lock assemblies.
Figure 12:
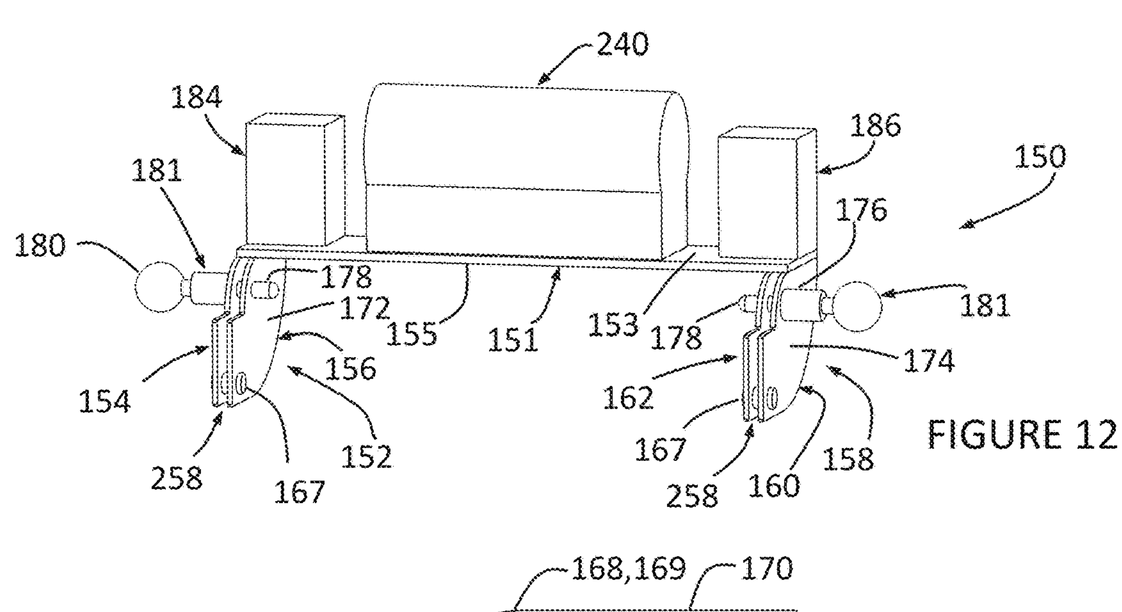
FIG. 12 depicts a rear perspective view of a floor assembly of a brush guard system.

FIG. 7 offers a right side view of a brush guard construct 103. FIG. 8 offers a left side view of the brush guard construct 103. FIG. 9 is a rear view of a brush guard construct with lock pins 178 of the lock assemblies 181 engaged and extending through the pivot plates. Figure on the other hand, is a rear view of a brush guard construct with lock pins of the lock assemblies retracted and absent from the plate gaps 258. FIG. 11 illustrates a brush guard construct whereby there is horizontal alignment between the pivot pins 167 and lock assembly 181. FIG. 13 illustrates an offset distance 'D' between the pivot hole 166 and lock hole 168 that matches the offset in the hook plates where the pivot pin resides and the lock pin resides.

Figure 15A:
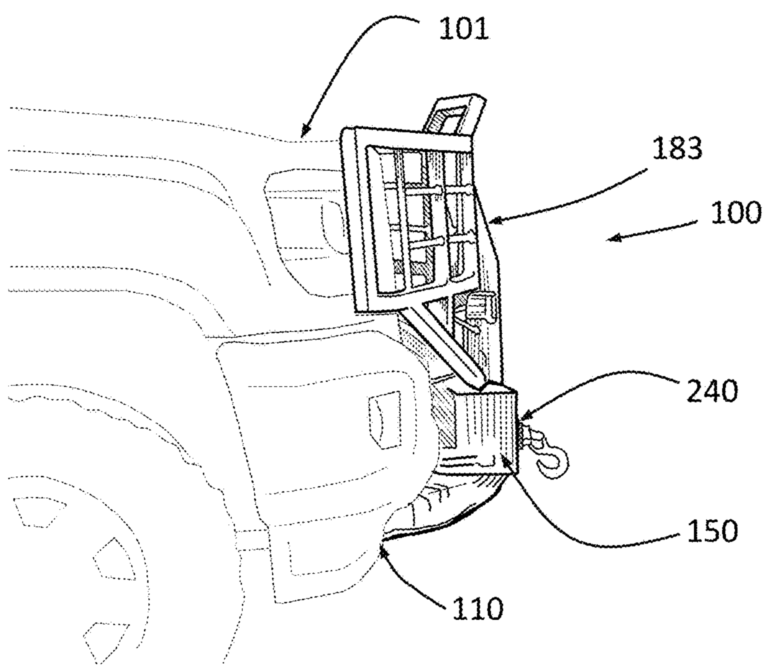
FIG. 15A depicts a side view of a brush guard system in a locked configuration mounted to a vehicle.
Figure 15B:
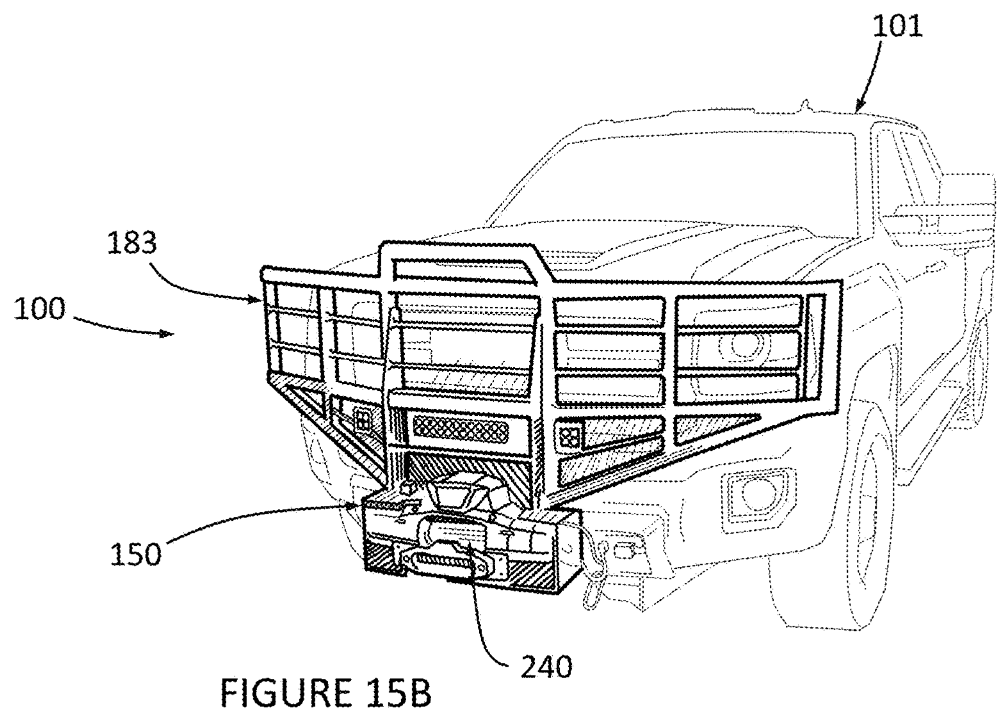
FIG. 15B depicts a front perspective view of a brush guard system in a locked configuration mounted to a vehicle.
Figure 15C:
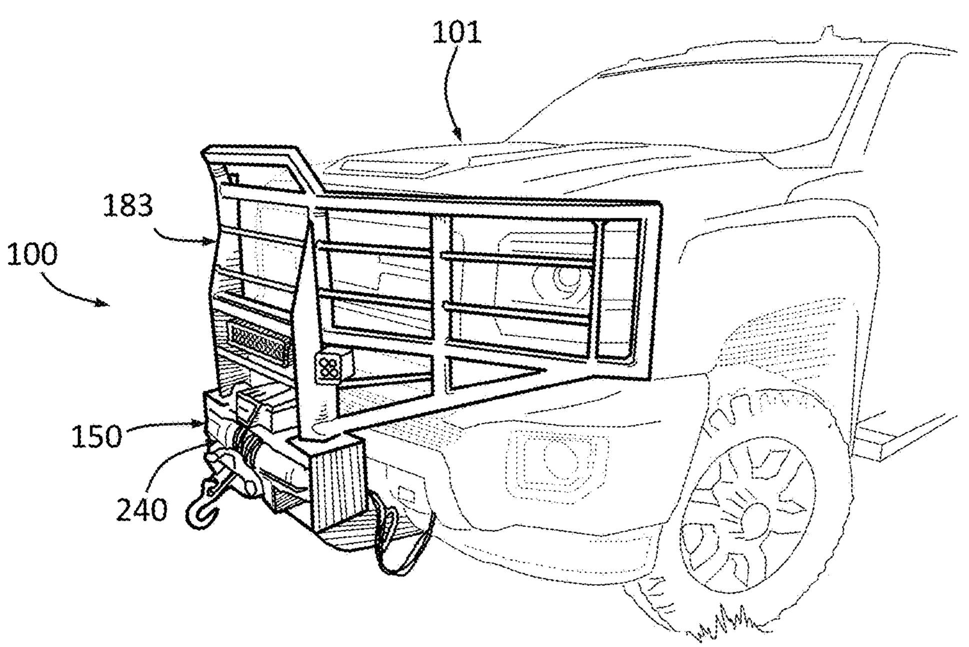
FIG. 15C depicts yet another front perspective view of a brush guard system in a locked configuration mounted to a vehicle.

FIG. 15A-C illustrate views of an embodiment of a brush guard system 100 in a locked configuration on a vehicle 101. A stand 262, as illustrated in FIG. 4 can be utilized to prop or cradle the brush guard construct when not attached to a vehicle as a convenient means to store or in preparation for reattachment when the next need arises.

Figures 16, 17:
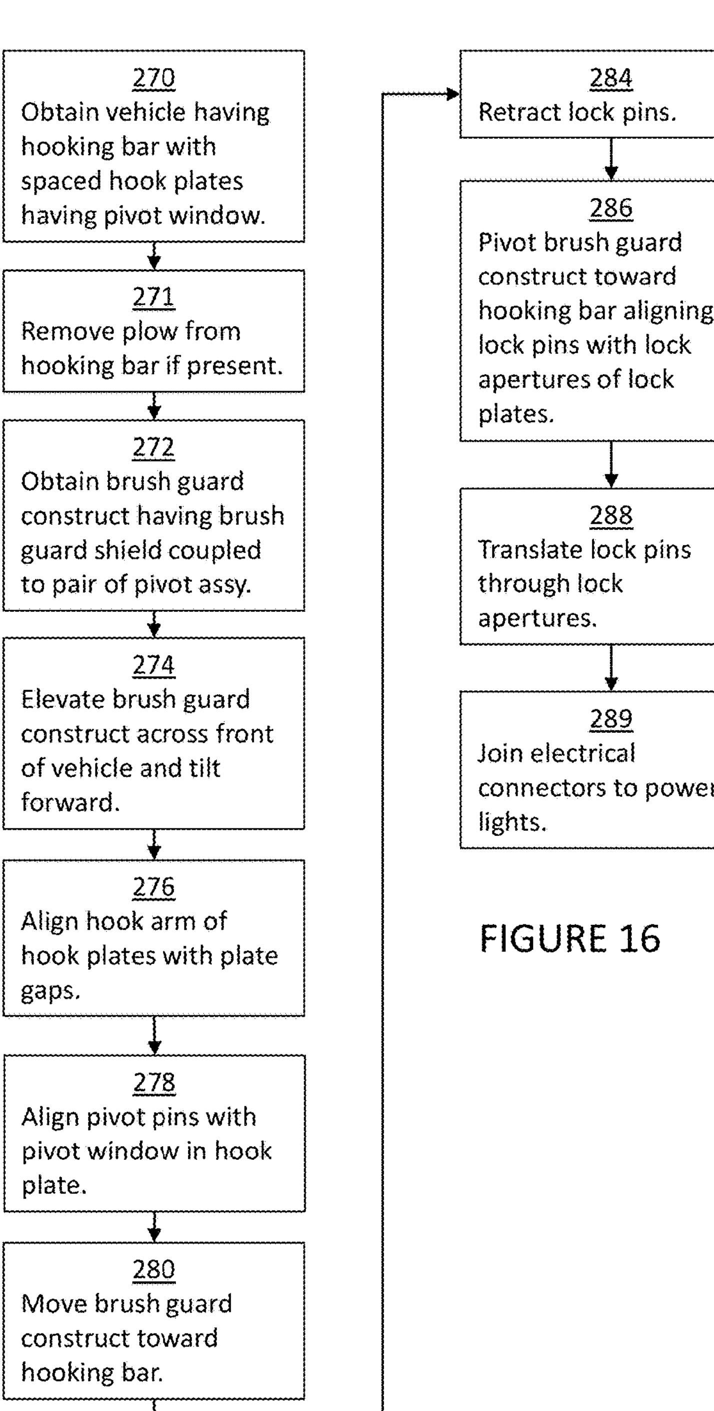
FIG. 16 is a diagram illustrating the steps involved in installing a brush guard construct to a hooking bar.
FIG. 17 is a diagram illustrating the steps involved in removing a brush guard construct from a hooking bar.

As illustrated in FIG. 16, one embodiment of a method of installing a brush guard construct to the front of a vehicle comprises the following steps. Obtaining a vehicle having a hooking bar coupled to the vehicle frame at the front end of the vehicle whereby the hooking bar comprises a pair of spaced hook plates. Each hook plate comprises a pivot wall defining a pivot window operable for inserting and seating a pivot pin of the brush guard construct therein (270). Removing a snowplow from the hooking bar if present (271). Obtaining a brush guard construct having a brush guard shield coupled to a pair of pivot assemblies which can be through a brush guard post and/or anchor block. The pivot assemblies having locking pins and whereas the pivot assemblies comprise a vertically orientated plate gap operable for receiving a portion of the hook plates therein and whereas a pivot pin extends across the plate gap (272). Elevating the brush guard construct across the front of the vehicle and tilting the brush guard construct forward (274). Aligning the hook arm of the hook plates with the respective plate gaps (276). Aligning the pivot pins with the pivot window in the hook plate (278). Moving the brush guard construct toward the hooking bar (280) and lowering the brush guard construct such that the pivot pins are seated against the pivot wall such and the pivot plates support the weight of the brush guard construct (282). Retracting the lock pins (284) then pivoting the brush guard construct toward the hooking bar aligning the lock pins with the lock apertures on the lock plates (286). Translating the lock pins through the lock apertures on the lock plates thereby securing the brush guard construct in a locked configuration (288). Joining electrical connectors to power lights mounted on the brush guard construct (289).

In one embodiment, removal of a brush guard construct from a hooking bar comprises the following steps (FIG. 17). Retracting the lock pins and pivoting the brush guard construct away from the hooking bar to move from a locked to an unlocked configuration by pivoting the brush guard construct away from the hooking bar (290). Lifting the brush guard construct out of the pivot window to remove the brush guard construct from the hooking bar (292). Lowering the brush guard construct on to a stand after separating it from the hooking bar (294).

Figures 18, 19, 20, 21:
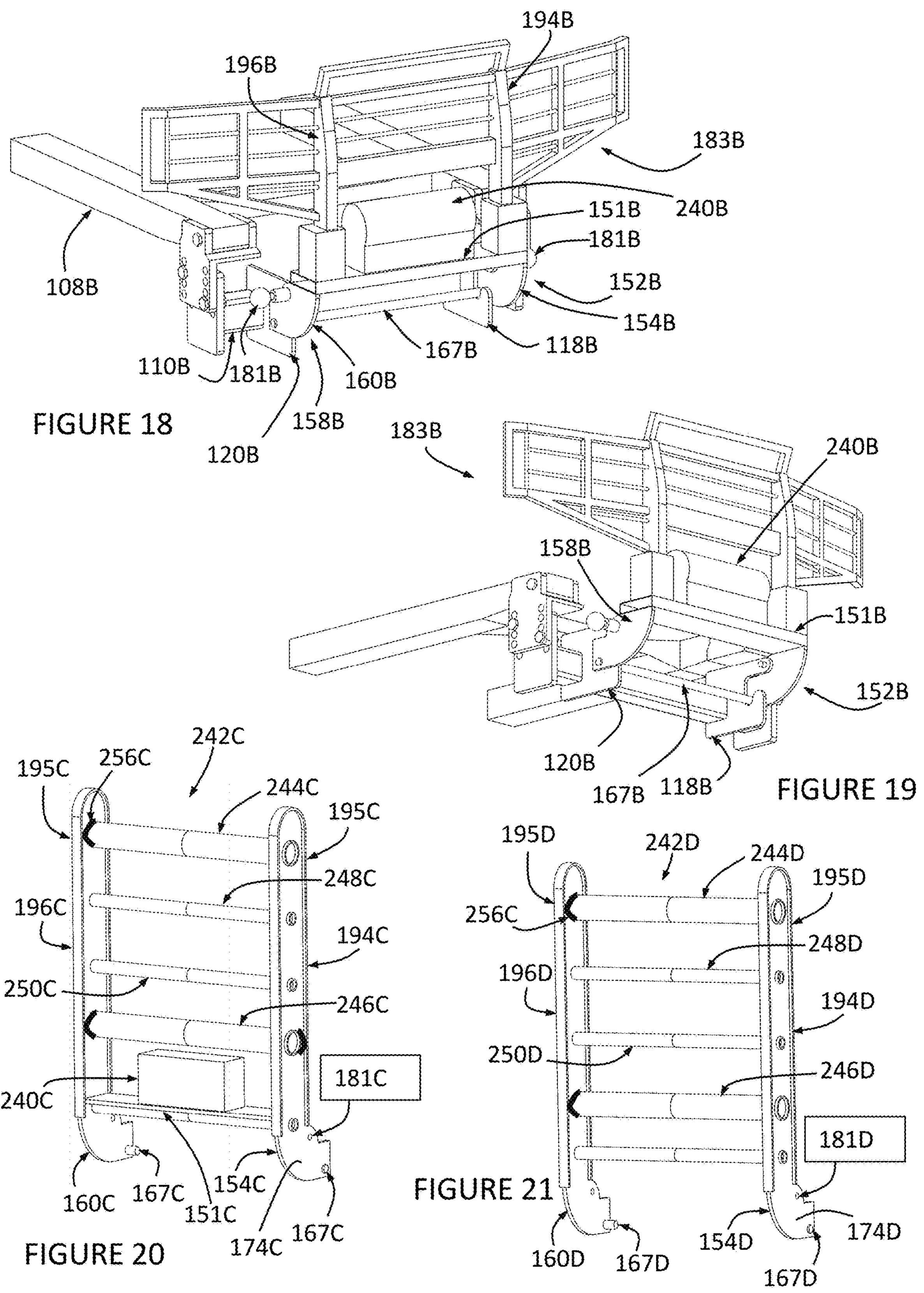
FIG. 18 depicts a top perspective view of a brush guard system with hooking bar.
FIG. 19 depicts a bottom perspective view of a brush guard system with hooking bar.
FIG. 20 depicts a partial perspective view of an alternative central support of a brush guard construct.
FIG. 21 depicts a partial perspective view of an alternative central support of a brush guard construct.

Depicted in FIG. 18 is an alternative embodiment of the construction of a brush guard construct 103B. Note in this embodiment, the left pivot assembly 152B and right pivot assembly 158B are absent an inner left pivot plate and an inner right pivot plate and therefore rely on the outer left pivot plate 154B and outer right pivot plate 160B to support the floor assembly 150B and/or brush guard shield 183B. This construction is also depicted in FIG. 19 from a bottom view. As another alternative, pivot pin 167B extends from the left pivot assembly to the right pivot assembly instead of utilizing a separate pivot pin on the left side and on the right side as depicted in prior embodiments. The ends of the pivot pin 167B can be welded to the respective outer left pivot plate 154B or outer right pivot plate 160B or secured using other methods known in the art such as fasteners, locking collars, or spring pins.

Note also that FIGS. 18-19 depict an alternative form of a base plate 151B. In this embodiment the base plate 151B is in the form of a tube having a generally rectangular cross-sectional profile. Although depicted here with the ends of the tube open, the ends of the tube can be capped if so desired. However, those skilled in the art will recognize that other profiles for the base plate can be used such as an 'I' beam, a 'C' channel, an 1' beam, beams having a rounded profile, or other beams known in the art. In embodiments that include a winch, the base plate preferably has a profile that is conducive for mounting the winch thereon using fasteners and therefore baseplates having a flat mounting surface can be advantageous.

FIGS. 20-21 depict additional alternative configurations for construction of a brush guard system. These Figures are partial views and represent only the mid-section 242C, 242D of their respective system. Other aspects of the system, such as the left brush guard wing and right brush guard wing, are hidden for simplicity. In this embodiment, note that a superior portion of outer left pivot plate 154C and outer right pivot plate 160C extend upward to form left brush guard post 194C and right brush guard post 196C. For added support, at least this superior portion of the brush guard posts are reinforced with an edge band (195C, 195D) welded substantially perpendicular to outer face (174C, 174D) to provide additional structural support. In some embodiments, the edge band extends further than depicted into a ground facing position.

The embodiment depicted in FIG. 21 is absent a base plate. This design choice saves material expense in cases where a base plate is not useful such as when a winch is not needed by an end user. The array of welded support beams extending between the left brush guard post and right brush guard post induce significant rigidity and strength to the system such that it can hold up against minor collisions with other vehicles or impact with animals such as deer thereby protecting the vehicle from damage. Note that the support beams can assume a variety of profiles. In FIGS. 20-21, the support beams are substantially round/circular, whereas in other embodiments the support beams are substantially square/rectangular. In some cases, at least one of the mid-section and wings are constructed by welded segments of straight tubing, whereas in other embodiments, at least one of the mid-section and wings are constructed from bent tubing thereby reducing the quantity of welds. It should be noted that in some embodiments, the right anchor block 186 and left anchor blocks 184 are absent wherein the brush guard posts (194,196) extend down to the base plate 151 or secured to or integral with the respective right and left pivot assemblies as depicted in FIGS. 20-21.

Figures 22, 23, 24, 25:
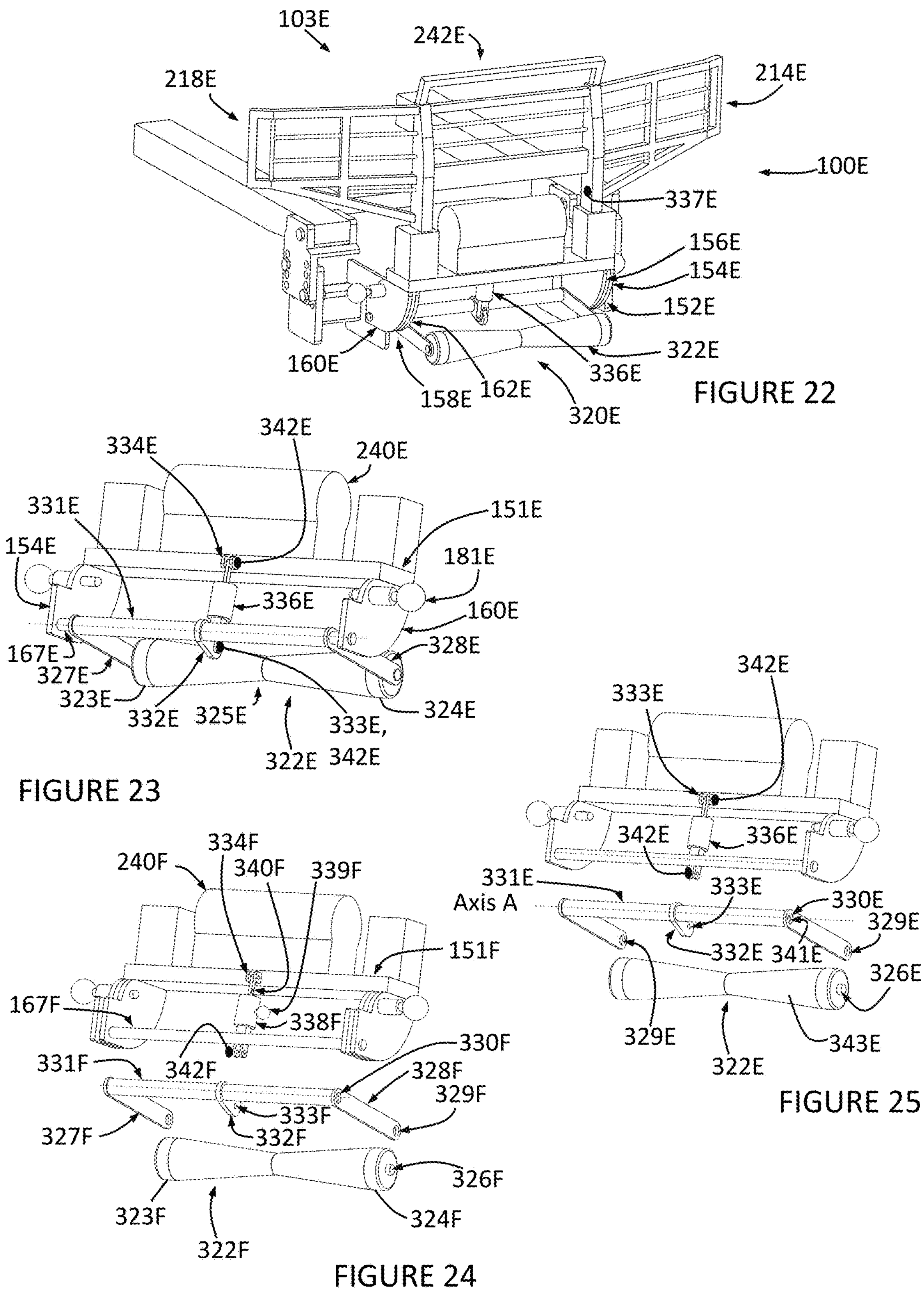
FIG. 22 depicts a top perspective view of a brush guard system with hooking bar and a pivot wheel transport assembly.
FIG. 23 depicts a partial perspective rear view a pivot wheel transport assembly.
FIG. 24 depicts an exploded view of a pivot wheel transport assembly with manually deployed pivot wheel.
FIG. 25 depicts an exploded view of a pivot wheel transport assembly with electric actuator to deploy the pivot wheel.
Figure 27:
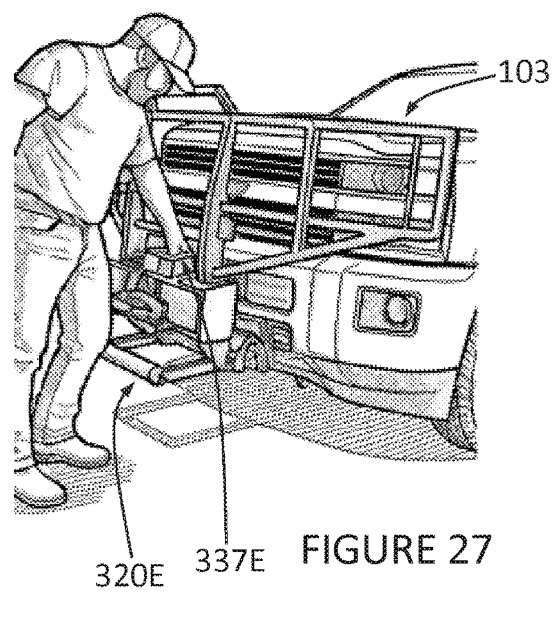
FIG. 27 depicts a perspective view of a step in donning/doffing a brush guard construct according the steps in FIG. 26.
Figure 28:
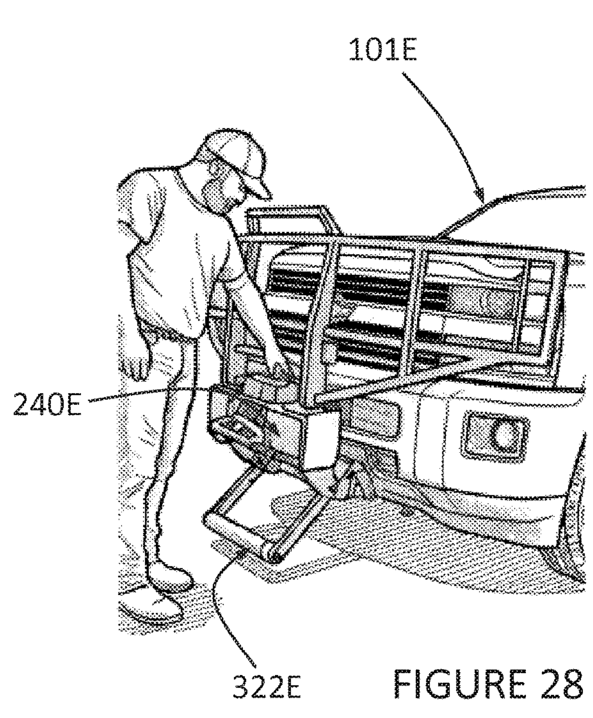
FIG. 28 depicts a perspective view of a step in donning/doffing a brush guard construct according the steps in FIG. 26.
Figure 29:
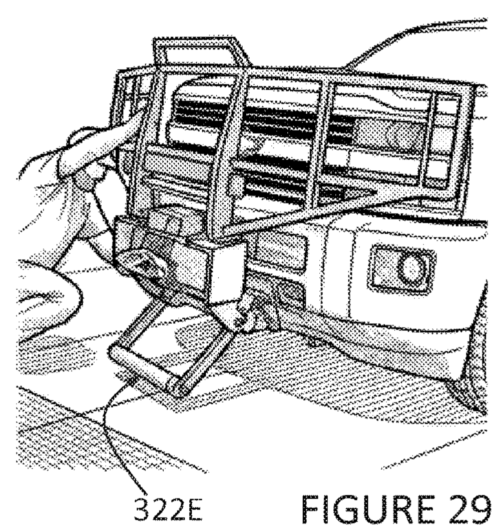
FIG. 29 depicts a perspective view of a step in donning/doffing a brush guard construct according the steps in FIG. 26.
Figure 30:
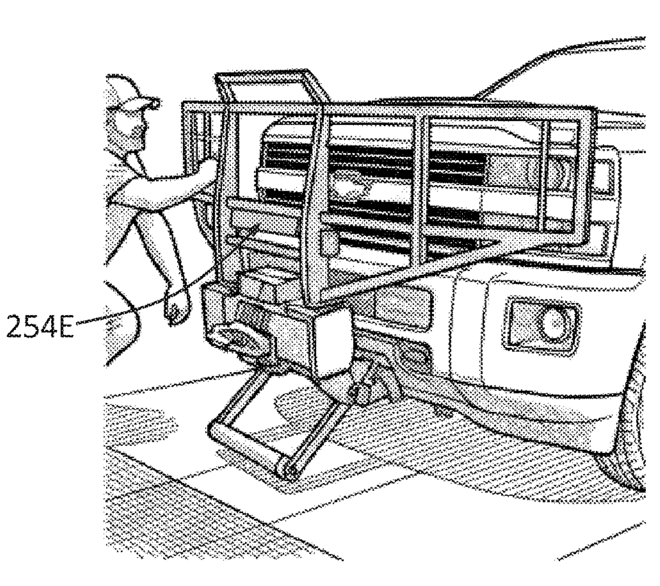
FIG. 30 depicts a perspective view of a step in donning/doffing a brush guard construct according the steps in FIG. 26.
Figure 31:
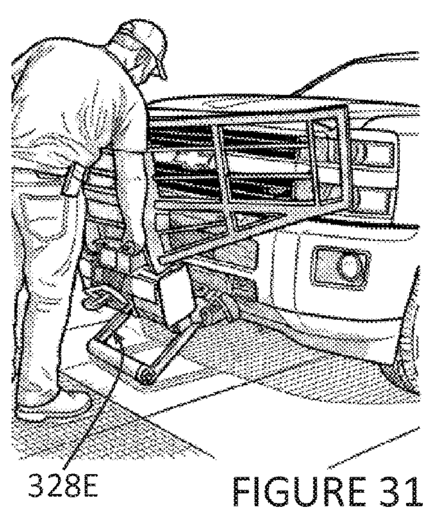
FIG. 31 depicts a perspective view of a step in donning/doffing a brush guard construct according the steps in FIG. 26.
Figure 32:
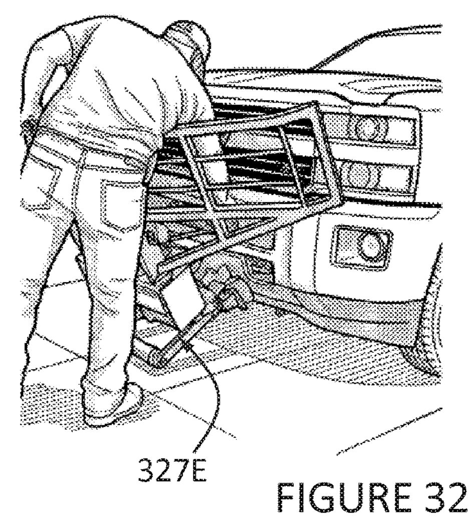
FIG. 32 depicts a perspective view of a step in donning/doffing a brush guard construct according the steps in FIG. 26.
Figure 33:
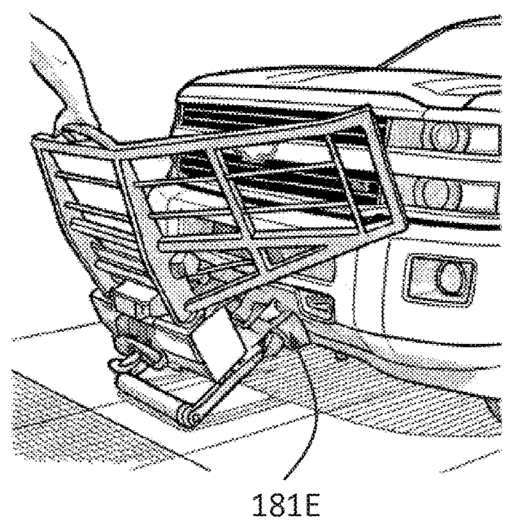
FIG. 33 depicts a perspective view of a step in donning/doffing a brush guard construct according the steps in FIG. 26.
Figure 34:
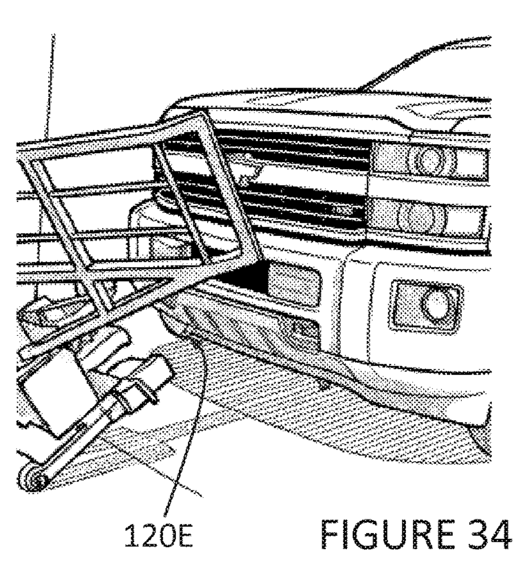
FIG. 34 depicts a perspective view of a step in donning/doffing a brush guard construct according the steps in FIG. 26.
Figure 35:
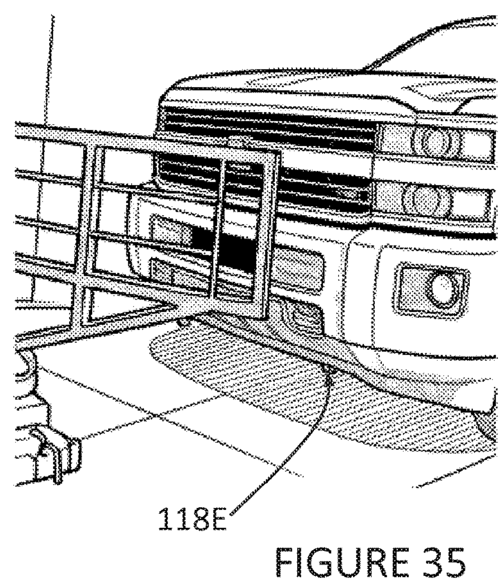
FIG. 35 depicts a perspective view of a step in donning/doffing a brush guard construct according the steps in FIG. 26.

FIG. 22 depicts a brush guard system 100E that includes a pivot wheel transport assembly 320E. The pivot wheel transport assembly comprises a pivot wheel 322E that is deployable towards a ground surface in a transport configuration wherein the pivot wheel provides eased transport of the brush guard towards or away from the vehicle 101 similar to how a refrigerator dolly moves a refrigerator. By tilting the brush guard construct 103 forward/back from the hooking plates, a single user can easily engage or remove the brush guard from the hooking plates. When tilted, the brush guard again is easily lowered over the pivot wheel for stable resting on the ground.

In this embodiment, pivot wheel transport assembly 320E comprises pivot wheel 322E. The pivot wheel in some embodiments has a cylindrical exterior face 343E, whereas in other embodiments the exterior face is concave or convex. For example, as noted in the Figures, the left contact 323E and the right contact 324E have a larger diameter than a central recess 325E portion of the pivot wheel. The pivot wheel 322E can utilize an axle 326E that extends through the pivot wheel. The ends of axle 326E are housed in axle recess 329E at one end of the spaced left arm 327E and right arm 328E. Alternatively, axle 326E doesn't extend through the pivot wheel, but rather are in the form of an axle extensions protruding at each end of the pivot wheel 322E. The axle ends can be threaded and secured with a nut or simply secured with a lock collar, pin or other method known in the art.

A torsion bar 331E spans between a pivot recess 330E on the left arm 327E and right arm 328E and is secured in this case by welds. In this embodiment, the torsion bar 331E comprises a torsion cannula 341E extending along Axis A that is configured to house and pivot about pivot pin(s) 167E. Extending from torsion bar 331E is torsion lever 332E creating a torque arm for moving the pivot wheel up and down in response to forces applied to the torsion lever. At one end of the torsion lever 332E is a drive pivot 333E that is pivotably fixed to one end of an electric actuator 336E or alternatively a manual linkage 338F. The other end of the electric actuator 336E (FIG. 23) or the manual linkage 338F (FIG. 24) is pivotably fixed to the respective base pivot (334E, 334F). The links of the components are secured together by pivot retainers (342E, 342F). Raising or lowering pivot wheel 322E involves toggling actuator switch 337E to cause consequent shortening or lengthening of the electric actuator resulting in the up or down movement of the pivot wheel 322E. The actuator is preferably supplied by power from the vehicle. Alternatively (FIG. 24), spring pin 339F of manual linkage 338F can be retracted, the pivot wheel adjusted to a new position (and thus a new length for the manual linkage), and then the spring pin is released to engage the desired option holes 340F. In an undeployed configuration, the pivot wheel 322E is elevated to be adjacent the floor assembly (base plate).

FIG. 26 and FIGS. 27-35 depict a method of donning or doffing a brush guard construct from a hooking bar of a vehicle using a pivot wheel transport assembly. The steps in the method are as follows. Obtaining a vehicle having a hooking bar secured to the vehicle with spaced hook plates that comprise a pivot window and lock apertures as disclosed herein, and with a pivotable brush guard seated within the hook plates (300—i.e. FIG. 27). Activating an electric actuator (or manual linkage) to lower the pivot wheel to the ground (302—i.e. FIG. 28). Retracting lock pins from the lock apertures (304—i.e. FIG. 29). Controlling the forward pivot until the brush guard is supported by the pivot wheel (306—i.e. FIG. 30). Activating (electric only) the actuator to raise the pivot wheel to cause the brush guard to pivot forward (308—i.e. FIG. 31). Releasing the electrical couplings between the vehicle and the brush guard (310—i.e. FIG. 32). Grasping the brush guard and pivoting it forward over the pivot wheel thereby releasing the brush guard from the hook plates (312—i.e. FIG. 33). Moving the brush guard away from the vehicle while balancing on the pivot wheel (314—i.e. FIG. 34). Pivoting the brush guard backwards until it is resting on the floor assembly (pivot plates) of the brush guard (316—i.e. FIG. 35). Donning the brush guard on the hook plates is completed by reversal of the above steps (318).

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A brush guard construct for the front of a vehicle in an operable configuration comprising:
- a left pivot assembly spaced from a right pivot assembly;
- at least one pivot pin extending along a pivot axis between said left pivot assembly and said right pivot assembly;
- said left and right pivot assembly comprising a lock assembly;
- said lock assembly comprising a retractable lock pin;
- a left brush guard post spaced from a right brush guard post;
- said left pivot assembly coupled to said left brush guard post;
- said right pivot assembly coupled to said right brush guard post;
- a brush guard shield extending from said left brush guard post and said right brush guard post; and,
- wherein said entire brush guard construct is operable to pivot forward about said pivot pin from the front of the vehicle when said lock pins are retracted.

2. The brush guard construct of claim 1 wherein said brush guard shield further comprises a mid-section of said brush guard shield extending between said left brush guard post and said right brush guard post.

3. The brush guard construct of claim 1 further comprising:
- a pivot wheel transport assembly;
- said pivot wheel transport assembly comprising a deployable pivot wheel operable to support said brush guard construct on said pivot wheel when transporting on a ground surface.

4. The brush guard construct of claim 3 further comprising:
- one or the other or both of a left arm and a right arm coupled to said brush guard construct;
- said pivot wheel extending from a free end of at least one of said left arm and said right arm; and,
- wherein movement of at least one of said left arm and said right arm determines position of said pivot wheel in relation to said brush guard shield.

5. The brush guard construct of claim 3 further comprising:
- an actuator;
- wherein said actuator controls position of said pivot wheel with respect to said brush guard shield.

6. The brush guard construct of claim 1 further comprising:
- said left pivot assembly comprising an outer left pivot plate;
- said right pivot assembly comprising an outer right pivot plate;
- a portion of said outer left pivot plate extending upwards forming at least a portion of said left brush guard post;
- a portion of said outer right pivot plate extending upwards forming at least a portion of said right brush guard post.

7. The brush guard construct of claim 1 further comprising:
- an edge band extending around a portion of at least one of said left brush guard post and said right brush guard post.

8. The brush guard construct of claim 1 further comprising:
- a winch;

wherein said winch is positioned between said left brush guard post and said right brush guard post.

9. The brush guard construct of claim 1 further comprising:

a base plate;

wherein said base plate is positioned between said left brush guard post and said right brush guard post and above said outer left pivot plate and said outer right pivot plate.

10. The brush guard construct of claim 1 wherein said pivot pin is in the form of a single pivot pin extending from said outer left pivot plate to said outer right pivot plate.

11. The brush guard construct of claim 1 wherein at least a portion of said brush guard shield is manufactured from bent tubing.

12. A method of removing a pivotable brush guard from a hooking bar of a vehicle comprising the following steps:

obtaining a vehicle having mounted to the vehicle a hooking bar with spaced hook plates extending from the hooking bar wherein the spaced hook plates have a pivot window for receiving a pivot pin and a lock aperture for receiving a lock pin extending through the hook plates, and wherein the brush guard comprises a left pivot assembly and a right pivot assembly having and at least one lock pin and at least one pivot pin extending at least partially between the left pivot assembly and right pivot assembly, the brush guard further comprising a pivot wheel within a pivot wheel transport assembly deployable by an actuator, and wherein the pivotable brush guard is seated within the hook plates.

13. The method of claim 12 further comprising:

activating the actuator to lower the pivot wheel to the ground.

14. The method of claim 12 further comprising:

retracting the lock pins from lock apertures on the hook plates to allow separation of the brush guard from the hook plates.

15. The method of claim 12 further comprising:

manually controlling forward pivot of the brush guard until its weight is fully supported by the pivot wheel.

16. The method of claim 12 further comprising:

activating the actuator to raise the pivot wheel with consequent lowering of the brush guard.

17. The method of claim 12 further comprising:

releasing electrical couplings between the brush guard and the vehicle.

18. The method of claim 12 further comprising:

grasping the brush guard and pivoting forward over the pivot wheel thereby releasing the brush guard from the hook plates.

19. The method of claim 12 further comprising:

moving the brush guard away from vehicle while balancing on the pivot wheel.

20. The method of claim 12 further comprising:

manually pivoting the brush guard backwards over the pivot wheel until the brush guard is seated on a ground surface.

* * * * *